United States Patent
Deng et al.

(10) Patent No.: US 11,984,974 B2
(45) Date of Patent: May 14, 2024

(54) METHOD AND DEVICE FOR TRANSMITTING DATA, SYSTEM, AND STORAGE MEDIUM

(71) Applicant: BOE TECHNOLOGY GROUP CO., LTD., Beijing (CN)

(72) Inventors: Wei Deng, Beijing (CN); Yifei Zhang, Beijing (CN); Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 272 days.

(21) Appl. No.: 17/355,233

(22) Filed: Jun. 23, 2021

(65) Prior Publication Data

US 2021/0409149 A1    Dec. 30, 2021

(30) Foreign Application Priority Data

Jun. 29, 2020  (CN) .................. 202010611564.4

(51) Int. Cl.
*H04L 1/00*    (2006.01)
*H04W 68/00*   (2009.01)
*H04W 88/16*   (2009.01)

(52) U.S. Cl.
CPC ......... *H04L 1/0025* (2013.01); *H04W 68/005* (2013.01); *H04W 88/16* (2013.01)

(58) Field of Classification Search
CPC .... H04L 1/0025; H04W 68/005; H04W 88/16
See application file for complete search history.

(56) References Cited

U.S. PATENT DOCUMENTS 10,477,585 B1 * 11/2019 Tsai .................. H04W 74/0816
2018/0024828 A1    1/2018 Nogueira-Nine et al.

FOREIGN PATENT DOCUMENTS

| CA | 2698328 A1 | * | 4/2009 | ........... H04L 69/166 |
| CN | 102137152 B | * | 8/2014 | ......... H04W 52/367 |
| CN | 107251531 A | | 10/2017 | |
| CN | 110913502 A | | 3/2020 | |
| JP | 2004528784 A | * | 9/2004 | |
| JP | 2004529523 A | * | 9/2004 | |
| WO | WO-2010028278 A2 | * | 3/2010 | .............. H04W 4/20 |
| WO | WO-2018112322 A2 | * | 6/2018 | ........... H04L 5/0053 |

* cited by examiner

*Primary Examiner* — Saad A. Waqas
(74) *Attorney, Agent, or Firm* — Lippes Mathias LLP

(57) ABSTRACT

A method for transmitting data includes: sending, by a server, a first message to a target terminal in response to determining that target data corresponding to the target terminal is long data, wherein the first message is intended to instruct the target terminal to enable a long data transmission mode before a first moment, and the long data is data untransmittable between a terminal and a gateway within one time slot; and sending, by the server, a second message to a first gateway, wherein the second message is intended to instruct the first gateway to enable the long data transmission mode before the first moment to receive the target data from the server, and the target data is sent to the target terminal from the first moment.

17 Claims, 8 Drawing Sheets

In response to determining that target data corresponding to a target terminal is long data, sending, by a server, a first message to the target terminal, wherein the first message is intended to instruct the target terminal to enable a long data transmission mode before a first moment, and the long data is data untransmittable between the terminal and a gateway within one time slot ~301

Sending, by the server, a second message to a first gateway, wherein the second message is intended to instruct the first gateway to enable the long data transmission mode before the first moment, to receive the target data from the server, and from the first moment, the target data is sent to the target terminal ~302

FIG. 3

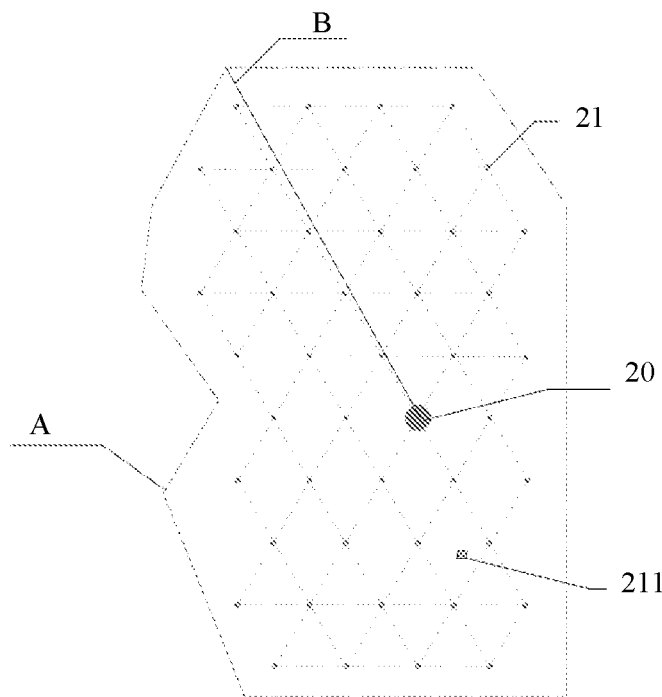

FIG. 4

METHOD AND DEVICE FOR TRANSMITTING DATA, SYSTEM, AND STORAGE MEDIUM

This application is based on and claims priority to Chinese Patent Application No. 202010611564.4, filed on Jun. 29, 2020 and entitled "METHOD FOR TRANSMITTING DATA, SYSTEM, AND STORAGE MEDIUM," the disclosure of which is herein incorporated by reference in its entirety.

TECHNICAL FIELD

Embodiments of the present disclosure relate to a method and device for transmitting data, and a system and a storage medium thereof.

BACKGROUND

An Internet of things (IoT) system includes a server, a gateway, and an IoT terminal. The IoT terminal accesses the server by the gateway. The gateway is responsible for information exchange between the IoT terminal and the server, and is an important transfer station in the IoT system.

For example, the IoT terminal is an electrophoresis display (EPD). During the use of the EPD, images and characters displayed by the EPD are sent to the EPD by the server by different gateways, which requires the EPD to switch between different gateways.

SUMMARY

Embodiments of the present disclosure provides a method and device for transmitting data, and a system and a storage medium thereof.

In a first aspect, a method for transmitting data is provided. The method is applicable to a server and includes: sending a first message to a target terminal in response to determining that target data corresponding to the target terminal is long data, wherein the first message is intended to instruct the target terminal to enable a long data transmission mode before a first moment, and the long data is data untransmittable between a terminal and a gateway within one time slot; and sending a second message to a first gateway, wherein the second message is intended to instruct the first gateway to enable the long data transmission mode before the first moment to receive the target data from the server, and the target data is sent to the target terminal from the first moment.

In some embodiments, prior to sending the first message by the server, the target terminal satisfies one of the following conditions: the gateway accessed by the target terminal is the first gateway, the second message is intended to instruct the first gateway to switch from a short data transmission mode to the long data transmission mode before the first moment, and short data is data transmittable between the terminal and the gateway within one time slot; and the gateway accessed by the target terminal is a second gateway, the first message includes indication information of the first gateway, and the second message includes indication information of the target terminal.

In some embodiments, the first message and the second message respectively include indication information of the first moment and indication information of the long data transmission mode.

In some embodiments, the first message and the second message each include a transmission parameter of the long data transmission mode.

In some embodiments, the transmission parameter includes at least one of a transmission frequency, a transmission bandwidth, and a spreading factor.

In some embodiments, the method further includes: determining a maximum communication distance of the first gateway in a first communication system, wherein the first communication system at least includes the first gateway and the target terminal; and determining the transmission parameter of the long data transmission mode based on the maximum communication distance and a maximum communication rate corresponding to the maximum communication distance.

In some embodiments, prior to sending the first message to the target terminal, the method further includes: determining that the target data is the long data in response to determining that the target data satisfies at least one condition; wherein the at least one condition includes: the target data includes image data, the target data includes firmware update data, and a data volume of the target data satisfies a preset condition.

In some embodiments, prior to enabling the long data transmission mode, the first gateway does not establish a network connection with a terminal other than the target terminal.

In some embodiments, prior to enabling the long data transmission mode by the first gateway, the method further includes: controlling the first gateway to disconnect the network connection between the first gateway and the terminal other than the target terminal.

In some embodiments, the method further includes: receiving a transmission result of the target data from the first gateway; and sending a third message to the first gateway based on the transmission result, wherein the third message is intended to instruct the first gateway to switch from the long data transmission mode to the short data transmission mode.

In a second aspect, a method for transmitting data is provided. The method is applicable to a first gateway and includes: enabling a long data transmission mode before a first moment based on a second message from a server; receiving target data from the server in response to enabling the long data transmission mode, wherein the target data is long data, and the long data is data untransmittable between a terminal and a gateway within one time slot; and sending the target data to a target terminal from the first moment based on the second message.

In some embodiments, prior to sending the second message by the server, the target terminal satisfies one of the following conditions: the gateway accessed by the target terminal is the first gateway, the second message is intended to instruct the first gateway to switch from a short data transmission mode to the long data transmission mode before the first moment, and short data is data transmittable between the terminal and the gateway within one time slot; and the gateway accessed by the target terminal is a second gateway, and the second message includes indication information of the target terminal.

In some embodiments, the second message includes indication information of the first moment and indication information of the long data transmission mode.

In some embodiments, the second message includes a transmission parameter of the long data transmission mode.

In some embodiments, the transmission parameter includes at least one of a transmission frequency, a transmission bandwidth, and a spreading factor.

In some embodiments, prior to enabling the long data transmission mode, the method further includes: sending a data packet to the target terminal, wherein the target terminal is configured to determine the transmission parameter of the long data transmission mode based on the data packet, and receiving the transmission parameter of the long data transmission mode from the target terminal; and enabling the long data transmission mode before the first moment based on the second message from the server includes: enabling the long data transmission mode before the first moment based on the second message and the transmission parameter of the long data transmission mode.

In some embodiments, prior to enabling the long data transmission mode, the first gateway does not establish a network connection with a terminal other than the target terminal.

In some embodiments, prior to enabling the long data transmission mode, the method further includes: disconnecting the network connection between the first gateway and the terminal other than the target terminal.

In some embodiments, in the process of sending the target data to the target terminal by the first gateway, the first gateway remains a sending state.

In some embodiments, the method further includes: sending a transmission result of the target data to the server; receiving a third message from the server; and switching from the long data transmission mode to the short data transmission mode based on the third message.

In a third aspect, a method for transmitting data is provided. The method is applicable to a target terminal and includes: enabling a long data transmission mode before a first moment based on a received first message; receiving target data from a first gateway from the first moment based on the first message in response to enabling the long data transmission mode, wherein the target data is long data, and the long data is data untransmittable between a terminal and a gateway within one time slot.

In some embodiments, prior to receiving the first message, the target terminal satisfies one of the following conditions: the gateway accessed by the target terminal is the first gateway; and the gateway accessed by the target terminal is a second gateway, and the first message includes indication information of the first gateway.

In some embodiments, the first message includes indication information of the first moment and indication information of the long data transmission mode.

In some embodiments, the first message includes a transmission parameter of the long data transmission mode.

In some embodiments, the transmission parameter includes at least one of a transmission frequency, a transmission bandwidth, and a spreading factor.

In some embodiments, prior to enabling the long data transmission mode, the method further includes: receiving a data packet from the first gateway, and determining the transmission parameter of the long data transmission mode based on the data packet; and enabling the long data transmission mode before the first moment based on the received first message includes: enabling the long data transmission mode before the first moment based on the first message and the transmission parameter of the long data transmission mode.

In some embodiments, the method further includes: sending the transmission parameter of the long data transmission mode to the first gateway.

In some embodiments, in the process of receiving the target data by the target terminal, the target terminal remains a receiving state.

In some embodiments, the method further includes: in response to completely receiving the target data, switching from the long data transmission mode to a short data transmission mode.

In a fourth aspect, a device for transmitting data is provided. The device is applicable to a server and includes: a memory and a processor; wherein the memory is configured to store a computer program; and the processor, when running the computer program stored in the memory, is caused to perform the method for transmitting data according to the first aspect above or any optional embodiments of the first aspect.

In a fifth aspect, a device for transmitting data is provided. The device is applicable to a first gateway and includes: a memory and a processor; wherein the memory is configured to store a computer program; and the processor, when running the computer program stored in the memory, is caused to perform the method for transmitting data according to the second aspect above or any optional embodiments of the second aspect.

In a sixth aspect, a device for transmitting data is provided. The device is applicable to a target terminal and includes: a memory and a processor; wherein the memory is configured to store a computer program; and the processor, when running the computer program stored in the memory, is caused to perform the method for transmitting data according to the third aspect above or any optional embodiments of the third aspect.

In a seventh aspect, a communication system is provided. The communication system includes: the server according to the fourth aspect; the first gateway according to the fifth aspect; and the target terminal according to the sixth aspect.

In an eighth aspect, a non-transitory computer-readable storage medium is provided. The computer-readable storage medium stores a computer program therein. The computer program, when run by a processor of an electronic device, causes the electronic device to perform the method for transmitting data according to the first aspect above or any optional embodiments of the first aspect.

In a ninth aspect, a non-transitory computer-readable storage medium is provided. The computer-readable storage medium stores a computer program therein. The computer program, when run by a processor of an electronic device, causes the electronic device to perform the method for transmitting data according to the second aspect above or any optional embodiments of the second aspect.

In a tenth aspect, a non-transitory computer-readable storage medium is provided. The computer-readable storage medium stores a computer program therein. The computer program, when run by a processor of an electronic device, causes the electronic device to perform the method for transmitting data according to the third aspect above or any optional embodiments of the third aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3 is a flowchart of a method for transmitting data according to an embodiment of the present disclosure;

FIG. 4 is a schematic diagram of determining a transmission parameter of a long data transmission mode according to an embodiment of the present disclosure;

DETAILED DESCRIPTION

Figure 1:
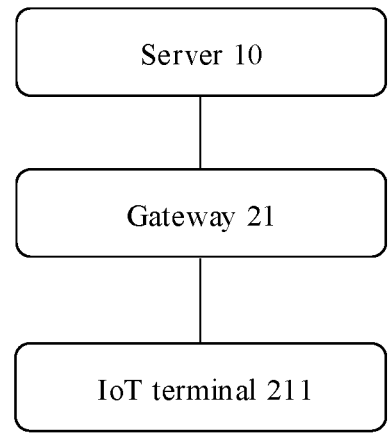
FIG. 1 is a schematic diagram of an IoT system according to an embodiment of the present disclosure.

For clearer descriptions of the objectives, technical solutions, and advantages of the present disclosure, embodiments of the present disclosure are described in detail hereinafter with reference to the accompanying drawings.

Unless otherwise defined, technical terms or scientific terms used in the present disclosure shall be taken to mean ordinary meanings as understood by the ordinary skill in the art to which the present disclosure belongs. The terms "first," "second," and similar words used in the present disclosure do not denote any order, quantity, or importance, but are merely configured to distinguish different components. The term "at least one" means one or a plurality of, and "a plurality of" means two or more. The symbol "I" indicates "or,", for example, A/B may indicate A or B. The term "and/or" is merely an association relationship describing an associated object, and indicates three relationships. For example, A and/or B may indicate three conditions that A exists separately, A and B exist at the same time, and B exists separately.

The IoT system includes a server, a gateway, and an IoT terminal, and the IoT terminal accesses the server by the gateway. The gateway is responsible for information exchange between the IoT terminal and the server. In order to ensure that the gateway can administer more IoT terminals, a working time period of the gateway is usually divided into a plurality of time slots. The IoT terminal accesses the network by competing the time slots, and each time slot can only be occupied by one IoT terminal.

The gateway in the IoT system may include a gateway for transmitting short data (for brevity, this gateway is called a short data gateway) and a gateway for transmitting long data (for brevity, this gateway is called a long data gateway). The IoT terminal usually accesses the server by the short data gateway. When the long data needs to be transmitted between the IoT terminal and the server, the gateway accessed by the IoT terminal is switched from the short data gateway to the long data gateway. In response to complete transmission of the long data, the gateway accessed by the IoT terminal is switched from the long data gateway to the short data gateway. In response to accessing the short data gateway, the IoT terminal periodically sends a heartbeat signal to the short data gateway, such that the short data gateway determines that the IoT terminal is connected to the short data gateway.

The short data refers to data that can be transmitted between a terminal (for example, the IoT terminal) and the gateway within one time slot. The long data refers to data untransmittable between the terminal (for example, the IoT terminal) and the gateway within one time slot. A data volume of the long data is relatively large, and a communication time period for transmitting the long data between the IoT terminal and the gateway is relatively long, which easily disrupts a heartbeat period of the IoT terminal (that is, a period of sending the heartbeat signal by the IoT terminal). As a result, the IoT terminal is disconnected from the network. Therefore, when the long data needs to be transmitted, the gateway accessed by the IoT terminal needs to be switched from the short data gateway to the long data gateway. In response to complete transmission of the long data, the gateway accessed by the IoT terminal is switched from the long data gateway to the short data gateway.

For example, the IoT terminal is an EPD. During the use of the EPD, the server sends image data to the EPD by a gateway special for transmitting images (for example, the long data gateway), and the EPD displays the images based on the image data. Besides, the server sends character data to the EPD by a gateway for transmitting characters (for example, the short data gateway), and the EPD displays the characters based on the character data. The server sends the image data and character data to the EPD by different gateways since the data volume of the image data is relatively large, and the communication time for transmitting the image data is relatively long, which will disrupt the heartbeat period of EPD; the data volume of the character data is relatively small, and the communication time for transmitting the character data is relatively short, which will not disrupt the heartbeat period of the EPD.

According to the above description, it can be known that in the IoT system, the IoT terminal needs to be switched between different gateways. At present, the gateway is usually switched manually, and a switching process is complicated, which easily affects the efficiency of data transmission.

In view of the above problems existing in the current gateway switching solution, embodiments of the present disclosure provide a method and device for transmitting data, a system, and a storage medium. In the technical solutions according to the embodiments of the present disclosure, in response to determining that target data corresponding to a target terminal is long data, a server sends a notification message to the target terminal and a first gateway, such that the target terminal and the first gateway enable a long data transmission mode before a first moment. Afterwards, the server sends the target data (that is, the long data) to the first gateway, and the first gateway sends the target data to the target terminal from the first moment to realize the transmission of the target data. The target terminal may be an IoT terminal. The technical solutions according to the embodiments of the present disclosure need no manual participation in the switching of the data transmission mode, which is favorable to ensure the efficiency of data transmission. The technical solutions of the present disclosure will be described below in conjunction with the drawings.

The technical solutions according to the embodiments of the present disclosure are applicable to the IoT system.

FIG. 1 is a schematic diagram of the IoT system according to an embodiment of the present disclosure. As shown in FIG. 1, the IoT system includes a server 10, a gateway 21 and an IoT terminal 21*l*. The gateway 21 is connected to the server 10 and the IoT terminal 21*l* respectively, and the IoT terminal 21*l* accesses the server 10 by the gateway 21.

The gateway 21 may have two transmission modes, namely a long data transmission mode and a short data transmission mode. The gateway 21 may be switched between the long data transmission mode and the short data transmission mode. For example, the gateway 21 is switched between the long data transmission mode and the short data transmission mode based on an instruction of the server 10.

In response to enabling the long data transmission mode, the gateway 21 may transmit the long data between the server 10 and the IoT terminal 21*l*. For example, the gateway 21 sends the long data from the server 10 to the IoT terminal 21*l*. In response to enabling the short data transmission mode, the gateway 21 may transmit short data between the server 10 and the IoT terminal 21*l*. For example, the gateway 21 sends the short data from the server 10 to the IoT terminal 21*l*. After the gateway 21 enables the short data transmission mode, the IoT terminal 21*l* periodically sends a heartbeat signal to the gateway 21. In order to prevent the transmission of the long data from disrupting a heartbeat period of the IoT terminal 21*l*, in response to enabling the short data transmission mode, the gateway 21 is not configured to transmit the long data between the server 10 and the IoT terminal 21*l*.

The IoT system usually includes a plurality of gateways. One gateway may administer at least one IoT terminal, and there may be gateways that do not administer the IoT terminals in the IoT system. In the IoT system: all gateways may have the long data transmission mode and the short data transmission mode; or, a part of gateways have the long data transmission mode and the short data transmission mode, and the other part of gateways have the long data transmission mode; or, a part of gateways have the long data transmission mode and the short data transmission mode, and the other part of gateways have the short data transmission mode; or, a part of gateways have the long data transmission mode, and the other part of gateways have the short data transmission mode; or, a part of gateways have the long data transmission mode and the short data transmission mode, another part of gateways have the long data transmission mode, and yet another part of gateways have the short data transmission mode.

Figure 2:
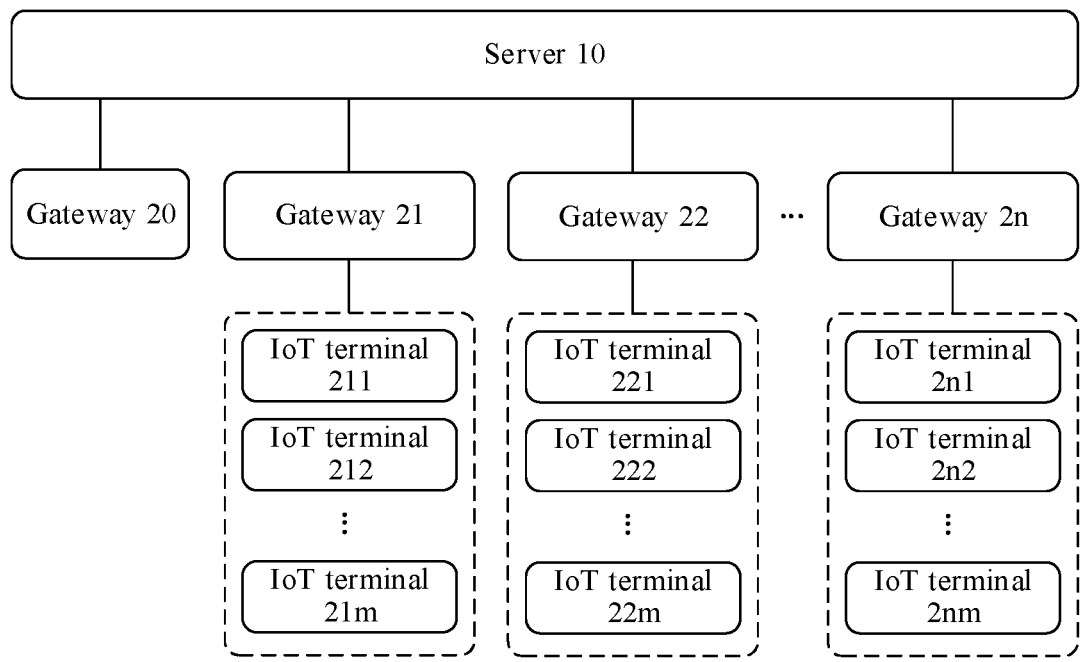
FIG. 2 is a schematic diagram of another IoT system according to an embodiment of the present disclosure.

FIG. 2 is a schematic diagram of another IoT system according to an embodiment of the present disclosure. As shown in FIG. 2, the IoT system includes a server 10, gateways 20 to 2*n*, IoT terminals 21*l* to 21*m*, IoT terminals 22*l* to 22*m*, and IoT terminals 2*nl* to 2*nm*. The gateway 20 does not administer an IoT terminal, and the gateway 20 has the long data transmission mode. In some embodiments, the gateway 20 also has the long data transmission mode. The gateways 21 to 2*n* respectively administer a plurality of IoT terminals. The IoT terminals 21*l* to 21*m* are the IoT terminals administered by the gateway 21, and the IoT terminals 21*l* to 21*m* access the server 10 by the gateway 21. The IoT terminals 22*l* to 22*m* are the IoT terminals administered by the gateway 22, and the IoT terminals 22*l* to 22*m* access the server 10 by the gateway 22. The IoT terminals 2*nl* to 2*nm* are the IoT terminals administered by the gateway 2*n*, and the IoT terminals 2*nl* to 2*nm* access the server 10 by the gateway 2*n*.

In the gateways 2*l* to 2*n*, there may be gateways with the long data transmission mode and the short data transmission mode, and/or gateways with the long data transmission mode, and/or gateways with the short data transmission mode. Each of the gateways 2*l* to 2*n* is configured to transmit long data and/or short data between the server 10 and the IoT terminal administered by the gateway. When the long data needs to be transmitted between an IoT terminal and the server 10, the server 10 may control the gateway accessed by the IoT terminal to enable the long data transmission mode. In response to complete transmission of the long data, the gateway accessed by the IoT terminal is controlled to be switched to the short data transmission mode. In some embodiments, when the long data needs to be transmitted between a certain IoT terminal and the server 10, the server 10 may control the IoT terminal to access the gateway with the long data transmission mode, and control the gateway to enable the long data transmission mode. In response to complete transmission of the long data, the IoT terminal is controlled to access the gateway with the short data transmission mode.

In the IoT system shown in FIG. 1 to FIG. 2, the gateway may be an access device such as an exchanger or a router. The IoT terminal may be various types of IoT terminals such as a smart home device, a smart wearable device, a smart sensing device, a smart display device, and a bedside card terminal. The smart home device is, for example, but not limited to: a smart refrigerator, a smart curtain, or the like. The smart wearable device is, for example, but not limited to: a smart badge, a smart bracelet, smart shoes, and the like. The smart sensing device is, for example, but not limited to: a smart electricity meter and a smart water meter. The bedside card terminal is, for example, the EPD of a bedside card of a hospital bed. In addition, the long data transmission mode includes but not limited to: a long range (LoRa) mode, a narrow band IoT (NB-IoT) mode, and the like. The short data transmission mode includes but not limited to: a frequency-shift keying (FSK) mode, a Bluetooth mode, a wireless-fidelity (Wi-Fi) mode, and the like.

The foregoing is an introduction to the IoT system of the present disclosure. The following describes embodiments of the method for transmitting data according to the present disclosure in conjunction with the foregoing IoT system.

FIG. 3 is a flowchart of a method for transmitting data according to an embodiment of the present disclosure. The method is applicable to a server, for example, the method is performed by the server. The server may be the server 10 as shown in FIG. 1 to FIG. 2. As shown in FIG. 3, the method includes the following processes:

In 301, in response to determining that target data corresponding to a target terminal is long data, the server sends a first message to the target terminal, wherein the first message is intended to instruct the target terminal to enable a long data transmission mode before a first moment, and long data is data untransmittable between a terminal and a gateway within one time slot.

The target terminal may send a data task request to the server, and the server may determine the target data corresponding to the target terminal based on the data task request of the target terminal. The target data is data requested to be acquired by the data task request. In response to determining the target data corresponding to the target terminal, the server identifies whether the target data is long data. If the target data is the long data, the server sends the first message to the target terminal, such that the target terminal enables the long data transmission mode before the first moment based on the first message. Optionally, if the target data is not long data, the target data is short data.

The first message may include indication information of the first moment and indication information of the long data transmission mode to indicate the target terminal to enable the long data transmission mode before the first moment. For example, the indication information of the first moment is an identifier of the first moment, and the indication information of the long data transmission mode is an identifier of the long data transmission mode. As an optional embodiment, the first message further includes a transmission parameter of the long data transmission mode to indicate the target terminal to enable the long data transmission mode based on the transmission parameter. That is, the target terminal is indicated to set the transmission parameter of the long data transmission mode. The transmission parameter includes at least one of a transmission frequency, a transmission bandwidth, and a spreading factor.

In the embodiment of the present disclosure, the long data is data untransmittable between the terminal and the gateway within one time slot. The long data has a relatively large data volume. For example, the long data may be image data, firmware update data, or the like. The image data is, for example, picture data, video data, and the like. The firmware update data is, for example, update data corresponding to an over-the-air technology (OTA). The image data and the upgrade data corresponding to the OTA have a relatively large data volume, the transmission of these data cannot be completed between the terminal and the gateway within one time slot. Therefore, the image data and the upgrade data corresponding to the OTA are determined to be the long data.

In an optional embodiment, identifying whether the target data is the long data includes: identifying, by the server, whether the target data satisfies at least one condition. If the target data satisfies the at least one condition, the server determines that the target data is the long data. If the target data does not satisfy the at least one condition, the server determines that the target data is not long data, that is, the target data is short data. The at least one condition includes: the target data includes the image data, the target data includes the firmware update data, and the data volume of the target data satisfies a preset condition. The preset condition includes: a ratio of a data length of the target data to a length of effective data that can be sent by the gateway within one time slot (for example, the gateway is in the short data transmission mode within one time slot) is greater than one. In response to identifying whether the data volume of the target data satisfies the preset condition, the server may determine the ratio of the data length of the target data to the length of the effective data that can be sent by the gateway within one time slot, and identify whether the ratio is greater than 1. If the ratio is greater than 1, the server determines that the target data is long data, otherwise the server determines that the target data is short data.

In another optional embodiment, it is preset that a long data task and a short data task correspond to different data task identifiers. The target terminal may carry a data task identifier in the data task request, and the server may identify whether the target data corresponding to the target terminal is the long data based on the data task identifier carried in the data task request of the target terminal.

In the present embodiment of the present disclosure, the target terminal is the IoT terminal in the IoT system, and the target terminal accesses the server by the gateway. The requests, messages, and data transmitted between the target terminal and the server are all forwarded by the gateway. Before the server sends the first message to the target terminal, the gateway accessed by the target terminal may be a first gateway or a second gateway. If the gateway accessed by the target terminal is the first gateway before the server sends the first message to the target terminal, then the target terminal sends the data task request to the server by the first gateway, and the server sends the first message to the target terminal by the first gateway. Similarly, if the gateway accessed by the target terminal is the second gateway before the server sends the first message to the target terminal, the target terminal sends the data task request to the server by the second gateway, and the server sends the first message to the target terminal by the second gateway. The first gateway is a gateway having the long data transmission mode, for example, the first gateway has the long data transmission mode and the short data transmission mode. The second gateway may be a gateway that does not have the long data transmission mode. For example, the second gateway has the short data transmission mode instead of the long data transmission mode.

In some embodiments, if the gateway accessed by the target terminal is the second gateway before the server sends the first message to the target terminal, the first message also includes indication information of the first gateway to indicate the target terminal to switch the gateway accessed by the target terminal to the first gateway. The indication information of the first gateway is, for example, an identifier of the first gateway, which is not limited in the embodiment of the present disclosure.

In 302, the server sends a second message to the first gateway, the second message is intended to instruct the first gateway to enable the long data transmission mode before the first moment, to receive the target data from the server, and from the first moment, the target data is sent to the target terminal.

The second message includes the indication information of the first moment and the indication information of the long data transmission mode to indicate the first gateway to enable the long data transmission mode before the first moment. For example, the indication information of the first moment is an identifier of the first moment, and the indication information of the long data transmission mode is an identifier of the long data transmission mode. As an optional embodiment, the second message further includes a transmission parameter of the long data transmission mode to indicate the first gateway to enable the long data transmission mode based on the transmission parameter. That is, the first gateway is indicated to set the transmission parameter of the long data transmission mode. The transmission parameter includes at least one of a transmission frequency, a transmission bandwidth, and a spreading factor.

As described in 301, before the server sends the first message to the target terminal, the gateway accessed by the target terminal is the first gateway or the second gateway. In the embodiment of the present disclosure, if the gateway accessed by the target terminal is the first gateway before the server sends the first message to the target terminal, then the first gateway is in the short data transmission mode before the server sends the second message to the first gateway. The second message is intended to instruct the first gateway to switch from the short data transmission mode to the long data transmission mode before the first moment. If the gateway accessed by the target terminal is the second gateway before the server sends the first message to the target terminal, the second message also includes indication information of the target terminal to indicate the first gateway that the target terminal needs to access the first gateway. The indication information of the target terminal is, for example, an identifier of the target terminal.

Based on the above description, it can be known that in the present embodiment of the present disclosure, if the gateway accessed by the target terminal is the first gateway before the server sends the first message to the target terminal, the first gateway only needs to switch the transmission mode without a need for gateway switching. If the gateway accessed by the target terminal is the second gateway before the server sends the first message to the target terminal, the gateway accessed by the target terminal needs to be switched.

In the embodiment of the present disclosure, an order of execution of 301 and 302 is not limited, that is, 301 may be performed before 302, or 302 may be performed before 301.

In summary, in the method for transmitting data according to the embodiment of the present disclosure, the server sends the first message to the target terminal in response to determining that the target data corresponding to the target terminal is long data, such that the target terminal enables the long data transmission mode before the first moment based on the first message. Besides, the server sends the second message to the first gateway, such that the first gateway enables the long data transmission mode before the first moment based on the second message. In this way, the first gateway can receive the target data from the server, the first gateway can send the target data to the target terminal from the first moment, so as to realize the transmission of the long data between the server and the target terminal. The present disclosure does not need manual participation in the switching of the data transmission mode, which is favorable to ensure the efficiency of data transmission.

In the present embodiment of the present disclosure, before the first gateway enables the long data transmission mode, the first gateway has not established a network connection with a terminal other than the target terminal. After the first gateway receives the second message, the long data transmission mode may be enabled. In some embodiments, before the long data transmission mode is enabled by the first gateway, the first gateway establishes the network connection with the terminal other than the target terminal (the first gateway may establish the network connection, or may not establish the network connection with the target terminal, which is not limited herein), and the server may control the first gateway to disconnect the network connection between the first gateway and the terminal other than the target terminal. For example, before sending the second message to the first gateway, the server sends a disconnection indication message to the first gateway, and the first gateway disconnects the network connection between the first gateway and the terminal other than the target terminal based on the disconnection indication message. In some embodiments, the server sends the second message to the first gateway. In response to receiving the second message, the first gateway firstly disconnects the network connection between the first gateway and the terminal other than the target terminal, and then enables the long data transmission mode based on the second message.

As an example, the first gateway has the long data transmission mode instead of the short data transmission mode. The first gateway is a gateway special for transmitting the long data in the IoT system. Before the first gateway enables the long data transmission mode, the first gateway has not established the network connection with a terminal other than the target terminal. As another example, the first gateway is any gateway in the IoT system. Before the first gateway enables the long data transmission mode, the first gateway disconnects the network connection between the first gateway and the terminal other than the target terminal. The terminal disconnected from the network connection with the first gateway may establish the network connection with other gateways in the IoT system.

In the embodiment of the present disclosure, before the first gateway enables the long data transmission mode, the server controls the first gateway to disconnect the network connection between the first gateway and the terminal other than the target terminal. In this way, when the first gateway administers a plurality of IoT terminals, after the first gateway enables the long data transmission mode, the IoT terminals which are administered by the first gateway and do not need to receive the long data are prevented from being disconnected from the network. For example, under normal circumstances, for example, OTA upgrade generally takes several hours or even a day, and it takes several hours or even a day for the gateways to transmit upgrade data corresponding to the OTA. If the gateways transmitting the upgrade data also administer the IoT terminals that do not need to receive the long data, these IoT terminals that do not need to receive the long data are caused to be disconnected from the network for a long time.

As mentioned above, in the embodiment of the present disclosure, the first message and the second message each include the transmission parameter of the long data transmission mode. Therefore, before the server sends the first message to the target terminal and the second message to the first gateway, the server may acquire the transmission parameter of the long data transmission mode.

As an optional embodiment, acquiring the transmission parameter of the long data transmission mode includes: determining, by the server, a maximum communication distance of the first gateway in a first communication system, and the first communication system at least includes the first gateway and the target terminal; and determining, by the server, the transmission parameter of the long data transmission mode based on the maximum communication distance and a maximum communication rate corresponding to the maximum communication distance.

For example, the server determines the maximum communication distance of the first gateway in the first communication system based on a position of the first gateway in the first communication system and a position of each node of the first communication system in the first communication system. Afterwards, the server determines at least one of a transmission frequency, a transmission bandwidth, and a spreading factor of communication between the first gateway and the target terminal when the maximum communication distance is satisfied and the communication rate is the maximum. The server determines at least one of the transmission frequency, the transmission bandwidth, and the spreading factor of the communication between the first gateway and the target terminal, when the maximum communication distance is satisfied and the communication rate is the maximum, as the transmission parameter of the long data transmission mode. The nodes include the gateways, the IoT terminals, the server, and the like.

FIG. 4 is a schematic diagram of determining the transmission parameter of the long data transmission mode according to an embodiment of the present disclosure. By taking the LoRa mode as an example of the long data transmission mode, as shown in FIG. 4, the first communication system includes a gateway 20, a gateway 21, and an IoT terminal 21*l*. A represents the edge of the first communication system, the first gateway may be the gateway 20, and the target terminal may be the IoT terminal 21*l*. The server may determine the maximum communication distance B needing to be covered by the gateway 20 for communication in the first communication system based on a position of the gateway 20 in the first communication system and the position of each node of the first communication system in the first communication system. The transmission frequency, transmission bandwidth, spreading factor and the like of LoRa communication are adjusted based on the maximum communication distance B, such that the communication rate of the gateway 20 under the maximum communication distance B reaches the maximum. The server determines the transmission frequency, the transmission bandwidth, and the spreading factor which correspond to the maximum communication rate of the gateway 20 at the maximum communication distance B as the transmission parameters for the long data transmission between the gateway 20 and the IoT terminal 21*l*, that is, as the transmission parameters of the long data transmission mode of the gateway 20 and the IoT terminal 21*l*.

In the embodiment of the present disclosure, after both the target terminal and the first gateway enable the long data transmission mode, the server may send the target data (long data) to the target terminal by the first gateway. For example, the server sends the target data to the first gateway, and the first gateway sends the target data to the target terminal from the first moment.

In response to sending the target data to the target terminal, the first gateway may acquire a transmission result of the target data, and send the transmission result of the target data to the server. Then the above method for transmitting data may further include: receiving, by the server, the transmission result of the target data from the first gateway; and sending, by the server, a third message to the first gateway based on the transmission result of the target data, the third message being intended to instruct the first gateway to switch from the long data transmission mode to the short data transmission mode. In response to receiving the third message, the first gateway is switched from the long data transmission mode to the short data transmission mode based on the third message. In this way, the first gateway may administer the plurality of IoT terminals needing to receive short data, and the number of gateways required by the IoT system is reduced, thereby reducing a cost of the IoT system.

As an optional embodiment, in response to receiving the target data, the target terminal sends a receiving result of the target data to the first gateway. The first gateway determines the transmission result of the target data based on the receiving result of the target data from the target terminal. The receiving result of the target data includes receiving success of the target data or receiving overtime of the target data (that is, receiving failure of the target data, usually, a receiving time period window of the target data may be set, and if an actual receiving time period of the target data exceeds the receiving time period window, the receiving of the target data is overtime). The transmission result of the target data includes transmission success of the target data or transmission overtime of the target data (that is, transmission failure of the target data). In response to receiving the transmission result of the target data, where the transmission result of the target data is the transmission success of the target data, the server sends the third message to the first gateway. In some embodiments, if the transmission result of the target data is transmission failure of the target data, the server may resend the target data to the first gateway, such that the first gateway resends the target data to the target terminal. In some embodiments, the server abandons sending the target data to the target terminal, which is not limited in the embodiment of the present disclosure.

The embodiment of the present disclosure takes the long data as an example of the target data. In some embodiments, the target data is short data. If the server determines that the target data is the short data, the server directly sends the target data to the target terminal by the gateway accessed by the target terminal, without triggering an execution process of the embodiment of the present disclosure.

Figure 5:
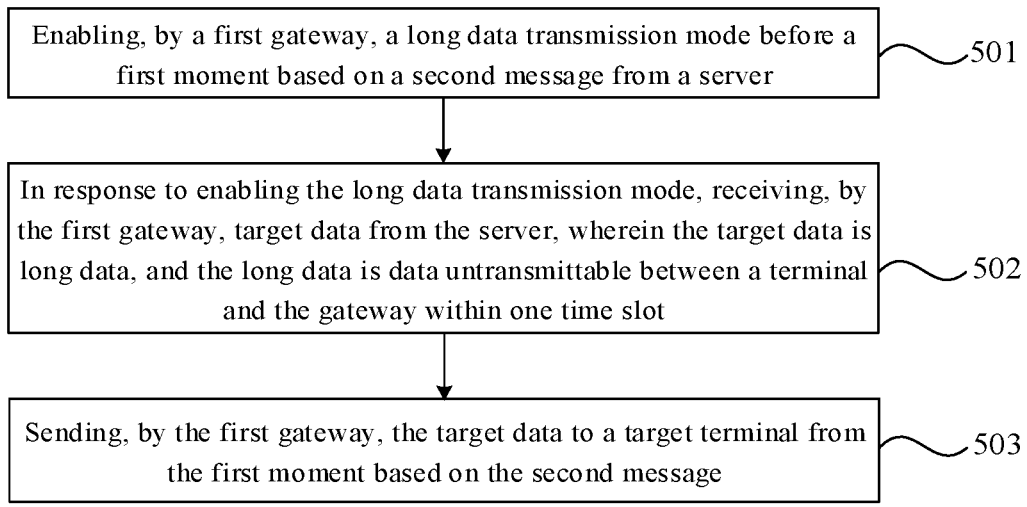
FIG. 5 is a flowchart of another method for transmitting data according to an embodiment of the present disclosure.

FIG. 5 is a flowchart of another method for transmitting data according to an embodiment of the present disclosure. The method is applicable to a first gateway, for example, the method is performed by the first gateway. The first gateway may be any gateway as shown in FIG. 1 to FIG. 2. For example, the first gateway is the gateway 21. As shown in FIG. 5, the method includes the following processes:

In 501, the first gateway enables a long data transmission mode before a first moment based on a second message from a server.

The first gateway may receive the second message from the server. The second message includes indication information of the first moment and indication information of the long data transmission mode, and the first gateway enables the long data transmission mode before the first moment based on the indication information of the first moment and the indication information of the long data transmission mode. As an optional embodiment, the second message further includes a transmission parameter of the long data transmission mode, and the first gateway enables the long data transmission mode based on the transmission parameter of the long data transmission mode. That is, the first gateway sets the transmission parameter of the long data transmission mode. The transmission parameter includes at least one of a transmission frequency, a transmission bandwidth, and a spreading factor.

In the present embodiment of the present disclosure, before the server sends the second message to the first gateway, the gateway accessed by the target terminal is the first gateway or a second gateway. If the gateway accessed by the target terminal is the first gateway before the server sends the second message to the first gateway, the first gateway is in a short data transmission mode before the server sends the second message to the first gateway, and the second message is intended to instruct the first gateway to switch from the short data transmission mode to the long data transmission mode before the first moment. In response to receiving the second message, the first gateway is switched from the short data transmission mode to the long data transmission mode before the first moment based on the second message. If the gateway accessed by the target terminal is the second gateway before the server sends the second message to the first gateway, the second message also includes indication information of the target terminal to indicate the first gateway that the target terminal needs to access the first gateway. The indication information of the target terminal is, for example, an identifier of the target terminal.

Based on the above description, it can be known that in the present embodiment of the present disclosure, if the gateway accessed by the target terminal is the first gateway before the server sends the second message to the first gateway, the first gateway only needs to switch the transmission mode without a need for gateway switching. If the gateway accessed by the target terminal is the second gateway before the server sends the second message to the first gateway, the gateway accessed by the target terminal needs to be switched.

In some embodiments, in response to enabling the long data transmission mode, the first gateway may send a response message to the server, and the server determines that the first gateway has successfully enabled the long data transmission mode based on the response message.

In 502, in response to enabling the long data transmission mode, the first gateway receives target data from the server, the target data is long data, and the long data is data untransmittable between the terminal and the gateway within one time slot.

After the long data transmission mode is enabled by the first gateway, the server may send the target data to the first gateway. The first gateway may receive the target data from the server. The target data is the long data, for example, the target data is image data, firmware update data, and the like.

In 503, the first gateway sends the target data to the target terminal from the first moment based on the second message.

In response to receiving the target data, the first gateway sends the target data to the target terminal from the first moment based on the second message.

As an optional embodiment, during the process that the first gateway sends the target data to the target terminal, the first gateway remains a sending state until the target data is completely sent, or until the target data is sent overtime. For example, in the process that the first gateway sends the target data to the target terminal, the first gateway remains an operating frequency of 433 MHz (megahertz), thereby enabling the first gateway to remain the sending state.

In the embodiment of the present disclosure, in the process that the first gateway sends the long data (for example, the target data), the first gateway remains the sending state, which can reduce a transmission delay caused by mode switching of a radio frequency module of the first gateway (in response to testing, it is found that the transmission delay generated by once mode switching is greater than 10 ms).

In summary, in the method for transmitting data according to the embodiment of the present disclosure, after the first gateway receives the second message from the server, the long data transmission mode is enabled before the first moment based on the second message. Then the first gateway receives the target data from the server, and the first gateway sends the target data to the target terminal from the first moment, so as to realize the transmission of long data between the server and the target terminal. The present disclosure does not need manual participation in the switching of the data transmission mode, which is favorable to ensure the efficiency of data transmission.

In the embodiment of the present disclosure, before the first gateway enables the long data transmission mode, the first gateway does not establish a network connection with a terminal other than the target terminal, and the first gateway may start the long data transmission mode in response to receiving the second message. In some embodiments, before the long data transmission mode is enabled by the first gateway, the first gateway establishes the network connection with the terminal other than the target terminal, and the first gateway may disconnect the network connection between the first gateway and the terminal other than the target terminal. In response to disconnecting the network connection between the first gateway and the terminal other than the target terminal, the first gateway enables the long data transmission mode based on the second message. For example, the first gateway disconnects the network connection between the first gateway and the terminal other than the target terminal based on a disconnection indication message from the server. In some embodiments, in response to receiving the second message, the first gateway firstly disconnects the network connection between the first gateway and the terminal other than the target terminal, and then enables the long data transmission mode based on the second message.

In the embodiment of the present disclosure, the transmission parameter of the long data transmission mode may be determined by the server and then carried in the second message and sent to the first gateway, and may also be determined by interaction between the first gateway and the target terminal. The manner of determining the transmission parameter of the long data transmission mode by the interaction between the first gateway and the target terminal is suitable for the situation where a position of the target terminal is fixed. The process for the server to determine the transmission parameter of the long data transmission mode may refer to relevant description in the embodiment shown in FIG. 3, which will not be repeated here. The process of determining the transmission parameter of the long data transmission mode by the interaction between the first gateway and the target terminal is mainly introduced.

As an optional embodiment, the first gateway sends a data packet to the target terminal, and the target terminal is configured to determine the transmission parameter of the long data transmission mode based on the data packet. In response to determining the transmission parameter of the long data transmission mode, the target terminal sends the transmission parameter of the long data transmission mode to the first gateway, and the first gateway receives the transmission parameter of the long data transmission mode from the target terminal.

In response to receiving the transmission parameter of the long data transmission mode from the target terminal, the first gateway enables the long data transmission mode before the first moment based on the second message and the transmission parameter of the long data transmission mode. For example, the first gateway adjusts a transmission parameter of the first gateway to the transmission parameter of the long data transmission mode before the first moment based on the second message and the transmission parameter of the long data transmission mode.

As an example, the first gateway and the target terminal firstly shake hands, that is, the first gateway sends the data packet to the target terminal; the target terminal receives the data packet from the first gateway, acquires a signal strength of communication between the target terminal and the first gateway based on the data packet, and determines a distance between the target terminal and the first gateway based on the signal strength. The transmission frequency, the transmission bandwidth, and the spreading factor, which maximize a communication rate of the target terminal, are calculated based on the distance. The transmission frequency, the transmission bandwidth, and the spreading factor when the communication rate of the target terminal reaches the maximum are determined as the transmission parameters for transmitting the long data between the target terminal and the first gateway. That is, the transmission parameters of the long data transmission mode between the target terminal and the first gateway are determined. In response to determining the transmission parameters of the long data transmission mode, the target terminal sends a response packet to the first gateway, and the response packet carries the transmission parameters of the long data transmission mode. In response to receiving the response packet, the first gateway sends a transmission parameter confirmation instruction to the target terminal. The signal strength is, for example, a received signal strength indication (RSSI), and the long data transmission mode is, for example, a LoRa mode.

In the embodiment of the present disclosure, in response to sending the target data to the target terminal, the first gateway may acquire a transmission result of the target data, and send the transmission result of the target data to the server. The above method for transmitting data may further include: sending, by the first gateway, the transmission result of the target data to the server; receiving, by the first gateway, a third message from the server; and switching the first gateway from the long data transmission mode to a short data transmission mode based on the third message. In response to switching from the long data transmission mode to the short data transmission mode, the first gateway may administer a plurality of IoT terminals needing to receive short data, and the number of gateways required by the IoT system is reduced, thereby reducing a cost of the IoT system. For example, in response to switching to the short data transmission mode, the first gateway is switched to an FSK mode, and the first gateway sends a broadcast message to the IoT terminals around the first gateway. The IoT terminals around the first gateway determine that the first gateway is in a short data receiving mode based on the broadcast message, and the IoT terminals needing to transmit the short data may access the first gateway.

Figure 6:
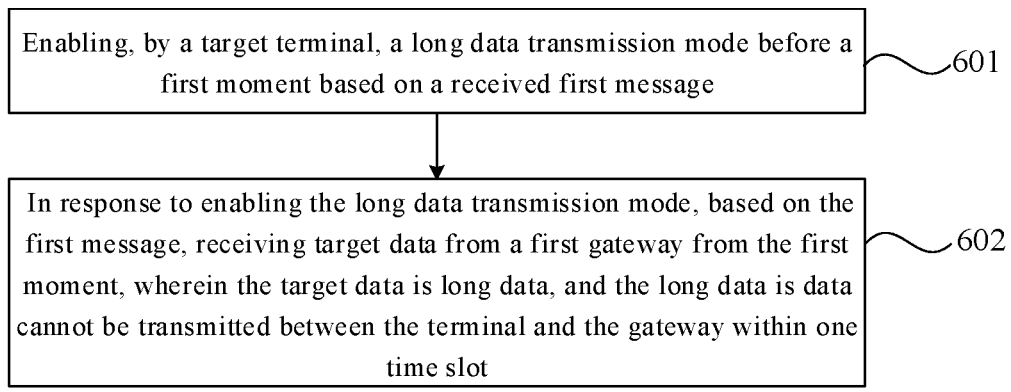
FIG. 6 is a flowchart of yet another method for transmitting data according to an embodiment of the present disclosure.

FIG. 6 is a flowchart of yet another method for transmitting data according to an embodiment of the present disclosure. The method is applicable to a target terminal, for example, the method is performed by the target terminal. The target terminal may be any IoT terminal in an IoT system, for example, the target terminal is the IoT terminal 21*l* as shown in FIG. 1 to FIG. 2. As shown in FIG. 6, the method includes the following processes:

In 601, the target terminal enables a long data transmission mode before a first moment based on a received first message.

The first message is sent by a server to the target terminal by a gateway accessed by the target terminal. Before the target terminal receives the first message, the gateway accessed by the target terminal is a first gateway or a second gateway. If the gateway accessed by the target terminal before the target terminal receives the first message is the first gateway, the server sends the first message to the first gateway, the first gateway sends the first message to the target terminal, and the target terminal receives the first message from the first gateway. If the gateway accessed by the target terminal before the target terminal receives the first message is the second gateway, the server sends the first message to the second gateway, the second gateway sends the first message to the target terminal, and the target terminal receives the first message from the second gateway.

The first message includes indication information of the first moment and indication information of the long data transmission mode. The target terminal may enable the long data transmission mode before the first moment based on the indication information of the first moment and the indication information of the long data transmission mode. As an optional embodiment, the first message further includes a transmission parameter of the long data transmission mode, and the target terminal enables the long data transmission mode based on the transmission parameter of the long data transmission mode. That is, the target terminal sets the transmission parameter of the long data transmission mode.

The transmission parameter includes at least one of a transmission frequency, a transmission bandwidth, and a spreading factor.

In some embodiments, if the gateway accessed by the target terminal before the target terminal receives the first message is the second gateway, the first message may also include indication information of the first gateway. The target terminal may switch the gateway accessed by the target terminal from the second gateway to the first gateway based on the instruction information of the first gateway. The indication information of the first gateway is, for example, an identifier of the first gateway.

In some embodiments, in response to enabling the long data transmission mode, the target terminal may send a response message to the server, and the server determines that the target terminal has successfully enabled the long data transmission mode based on the response message. The target terminal may send the response message to the server by the gateway currently accessed by the target terminal (for example, the first gateway or the second gateway).

In 602, after the long data transmission mode is enabled, based on the first message, the target data from the first gateway is received from the first moment, the target data is long data, and the long data is data untransmittable between the terminal and the gateway within one time slot.

In some embodiments, in the process that the target terminal receives the target data, the target terminal remains a receiving state until the target data is received completely. For example, when the target terminal remains the receiving state, the target terminal does not need to respond to every received data packet, thereby reducing a transmission delay caused by mode switching of a radio frequency module of the target terminal.

In summary, in the method for transmitting data according to the embodiment of the present disclosure, after the target terminal receives the first message, the long data transmission mode is enabled before the first moment based on the first message; afterwards, the target terminal receives the target data from the first gateway from the first moment, to realize the transmission of long data. The present disclosure does not need manual participation in the switching of the data transmission mode, which is favorable to ensure the efficiency of data transmission.

In the embodiment of the present disclosure, in response to completely receiving the target data, the target terminal is switched from the long data transmission mode to a short data transmission mode to receive short data. In addition, in response to receiving the target data, the target terminal sends a receiving result of the target data to the first gateway, such that the first gateway determines a transmission result of the target data based on the receiving result of the target data.

In the embodiment of the present disclosure, the transmission parameter of the long data transmission mode may be determined by the server and then carried in the first message and sent to the target terminal, and may also be determined by interaction between the first gateway and the target terminal. The manner of determining the transmission parameter of the long data transmission mode by the interaction between the first gateway and the target terminal is suitable for the situation where a position of the target terminal is fixed. The process for the server to determine the transmission parameter of the long data transmission mode may refer to relevant description in the embodiment shown in FIG. 3, which will not be repeated here. Here, the process of determining the transmission parameter of the long data transmission mode by the interaction between the first gateway and the target terminal is mainly introduced.

As an optional embodiment, the target terminal receives the data packet from the first gateway, and the target terminal determines the transmission parameter of the long data transmission mode based on the data packet. In response to determining the transmission parameter of the long data transmission mode, the target terminal enables the long data transmission mode before the first moment based on the first message and the transmission parameter of the long data transmission mode. For example, based on the first message and the transmission parameter of the long data transmission mode, the target terminal adjusts a transmission parameter of the target terminal to the transmission parameter of the long data transmission mode before the first moment. In response to determining the transmission parameter of the long data transmission mode, the target terminal may send the transmission parameter of the long data transmission mode to the first gateway, such that the first gateway adjusts a transmission parameter of the first gateway to the transmission parameter of the long data transmission mode before the first moment based on the second message and the transmission parameter of the long data transmission mode.

Figure 7:
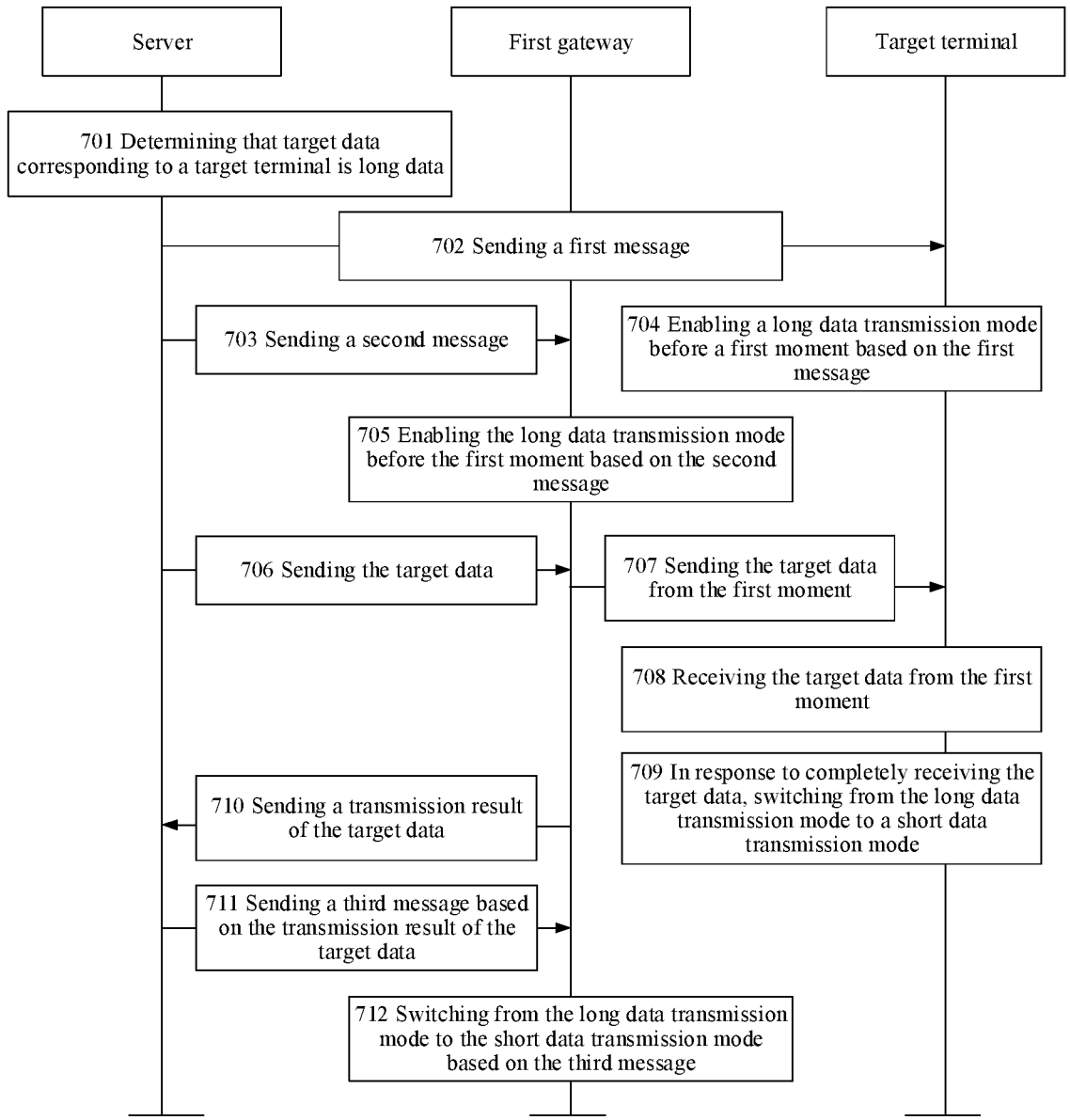
FIG. 7 is a flowchart of still a further method for transmitting data according to an embodiment of the present disclosure.

FIG. 7 is a flowchart of still a further method for transmitting data according to an embodiment of the present disclosure. The method is applicable to an IoT system, for example, the method is applicable to the IoT system as shown in FIG. 1 to FIG. 2. In the embodiment shown in FIG. 7, the server may be the server 10 shown in FIG. 1 to FIG. 2, and the first gateway may be the gateway 21 shown in FIG. 1 to FIG. 2. As shown in FIG. 7, the method includes the following processes:

In 701, the server determines that target data corresponding to a target terminal is long data.

In 702, the server sends a first message to the target terminal.

In 703, the server sends a second message to the first gateway.

In 704, the target terminal enables a long data transmission mode before a first moment based on the first message.

In 705, the first gateway enables the long data transmission mode before the first moment based on the second message.

In 706, the server sends the target data to the first gateway.

In 707, the first gateway sends the target data to the target terminal from the first moment.

In 708, the target terminal receives the target data from the first gateway from the first moment.

In 709, in response to completely receiving the target data, the target terminal is switched from the long data transmission mode to a short data transmission mode.

In 710, the first gateway sends a transmission result of the target data to the server.

In 711, the server sends a third message to the first gateway based on the transmission result of the target data.

In 712, the first gateway is switched from the long data transmission mode to the short data transmission mode based on the third message.

A procedure of respective processes in the embodiment shown in FIG. 7 may refer to related descriptions in the embodiments shown in FIG. 3, FIG. 5, and FIG. 6, which will not be repeated here.

In order to make a reader understand the method for transmitting data according to the embodiment of the present disclosure more clearly, the method will be exemplified below in conjunction with FIG. 8 and FIG. 9. In an exemplary application scenario of the method, the method may be used in an EDP bedside card system. The IoT terminal in the EDP bedside card system is a bedside card terminal, and specifically may be an EDP bedside card. The method can realize data transmission between a server and the EDP bedside card.

Figure 8:
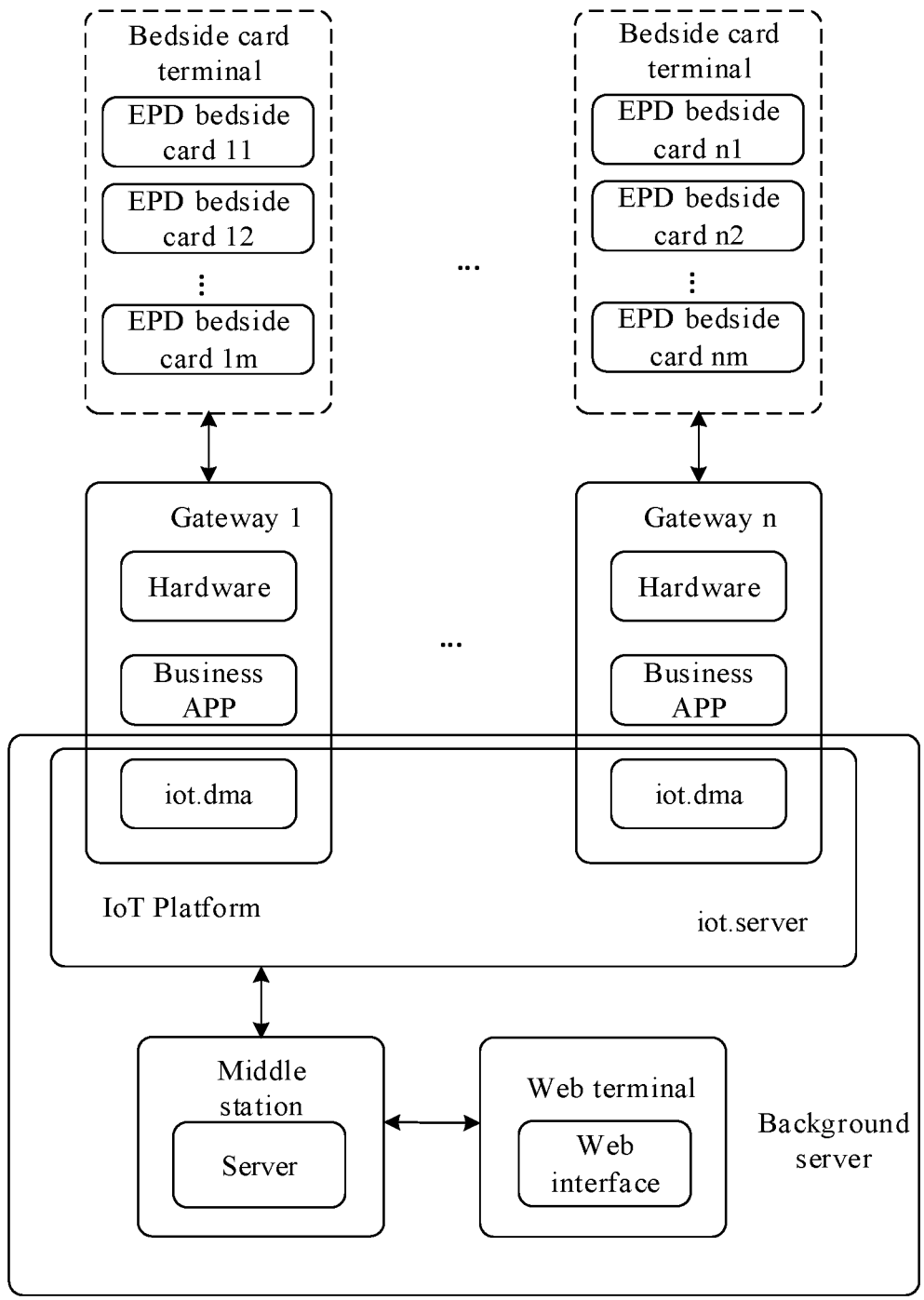
FIG. 8 is a schematic diagram of an EDP bedside card system according to an embodiment of the present disclosure.

FIG. 8 is a schematic diagram of the EDP bedside card system according to an embodiment of the present disclosure. As shown in FIG. 8, the EDP bedside card system includes a plurality of EPD bedside cards (an example of the above target terminal), gateways 1 to n, and a background server (an example of the above server). The background server is configured to manage the gateways 1 to n. One gateway can administer a plurality of EPD bedside cards, and one EPD bedside card can only select one gateway to access the network. For example, as shown in FIG. 8, gateway 1 administers EPD bedside cards 1*l* to 1*m*, and each EPD bedside card accesses one gateway. Respective components involved in the EDP bedside card system are described below.

The background server is responsible for data management and maintenance, including but not limited to issuance of a base map (an example of the above image), an OTA upgrade file (an example of the above firmware update data), text (an example of the above character), and management of the gateways. The background server includes a Web terminal, a middle station (server terminal), and an IoT (Internet of things) platform. The Web terminal is configured to present a user interface (Web interface), and the Web terminal may provide an interface for user input, such that a user can create a long data task and/or a short data task by the interface. The server terminal is configured to issue the data task (long data task and/or short data task), that is, issue the data task to the EPD bedside card by the gateway. The server terminal is also configured to control issuance time of the long data task, an identifier of the issuance gateway, mode switching of the corresponding EPD bedside card, mode switching of the gateway, or the like. The IoT platform is configured to monitor a status of each EPD bedside card and forward the data. The data task issued by the server terminal needs to be forwarded to the gateway by the IoT platform.

The gateway is a transfer station connected to the background server and the EPD bedside card. The gateway performs information interaction with the EPD bedside card by a wireless local area network, and performs information interaction with the background server by a wired and/or wireless Ethernet. The gateway may include hardware and software. The software includes a business application (APP) and a data processing module iot.dma configured to interact with the IoT platform. In a normal working mode of the system, a communication mode between the gateway and the EPD bedside card is an FSK mode. The FSK mode has a short transmission distance and fast response, which is suitable for the transmission of short data that requires higher real-time performance. When the background server needs to issue long data to one certain EPD bedside card, as an example, the background server issues a notification message to two gateways. One of the two gateways is the gateway currently accessed by the EPD bedside card. The notification message sent by the background server to the gateway includes indication information of the EPD bedside card needing to receive the long data, a moment when the EPD bedside card needs to receive the long data, indication information of the gateway to issue the long data to the EPD bedside card, and a mode switching parameter (for example, the transmission parameter of a long data transmission mode), or the like. The other of the two gateways is the gateway needing to issue the long data to the EPD bedside card. The notification message sent by the background server to the gateway includes an identifier of the EPD bedside card needing to receive the long data, a moment when the gateway issues the long data, a mode switching parameter, or the like. A trigger frequency of the long data task is relatively small, and the long data task is triggered once in a few months or even longer.

The EPD bedside card includes a storage module, a main control module, a radio frequency module (for example, an Sx1278 module), a display module, and the like. The EPD bedside card has functions such as information interaction, information display, and network access. The information interaction includes but not limited to: interaction with the gateway by the Sx1278 module for network access, data receiving, and the like. The information display includes but not limited to: the display of the received base map, the notification message, and other information, for example, the display of information such as patient names, care levels, and doctors in charge. The EPD bedside card may access and remain the network by monitoring a broadcast message from the gateway, registering to the gateway, sending a heartbeat signal to the gateway and the like. The EPD bedside card may be upgraded over the air in response to receiving the upgrade file.

Figure 9:
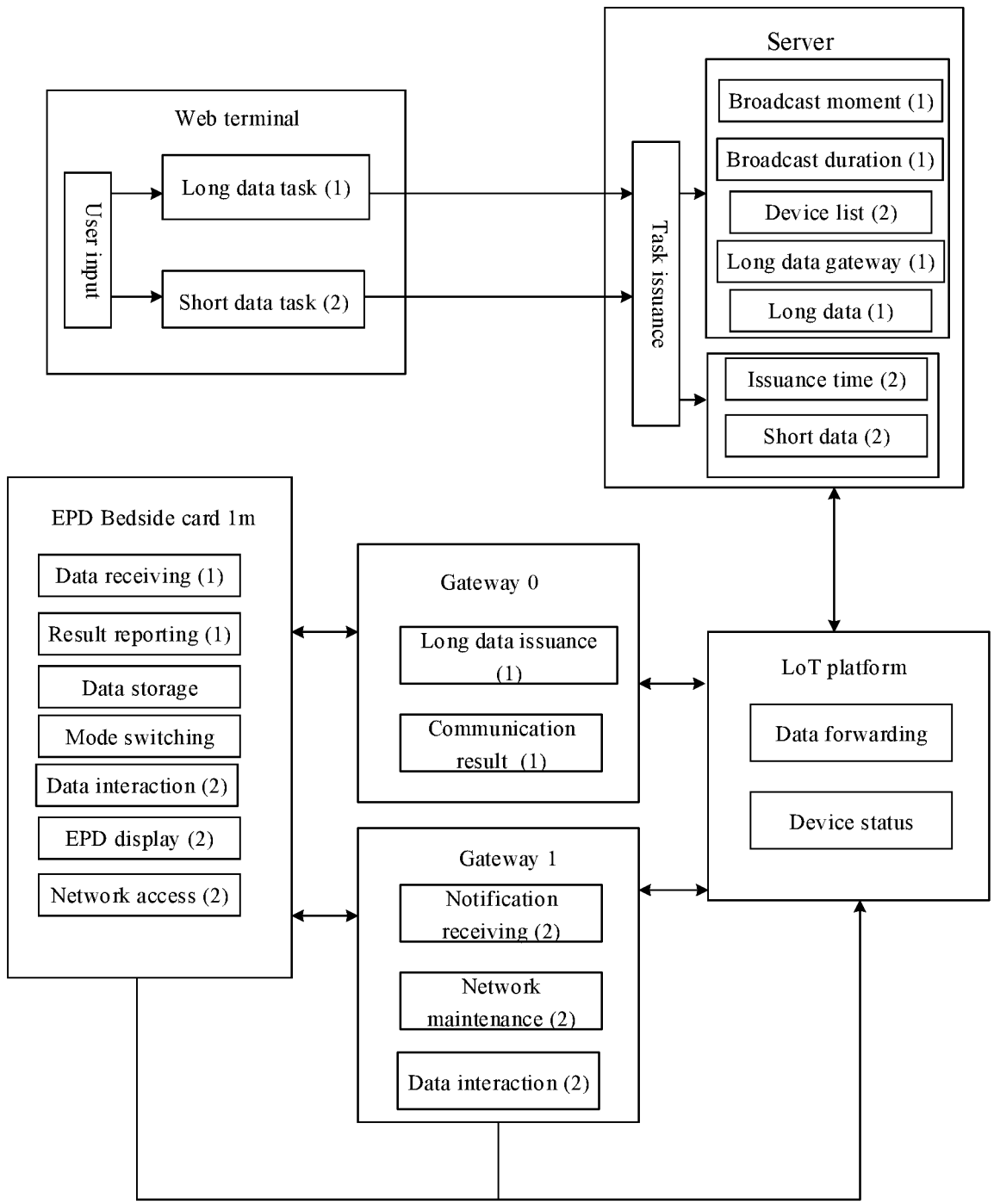
FIG. 9 is a schematic diagram of performing data transmission based on the EDP bedside card system according to an embodiment of the present disclosure.

FIG. 9 is a schematic diagram of data transmission applicable to the EPD bedside card system of FIG. 8. The process marked with (1) in FIG. 9 is a long data issuance process, the process marked with (2) is a short data issuance process, and the unmarked process is a process in which both the long data issuance and the short data issuance need to be performed. The data transmission process is as follows:

Firstly, a user inputs information on the Web terminal of the background server, and the Web terminal creates a data task based on the information input by the user, and transmits the created data task and an identifier (ID) of the data task to the server terminal. The information input by the user may include base map change information, program upgrade information, or hospital bed change information, and the like. The data task created by the Web terminal may include a long data task and a short data task.

The server terminal creates a task list based on the data task transmitted by the Web terminal and the ID of the data task. Generally, there are only short data tasks in the task list. When the server terminal finds that there is a long data task in the task list, the server terminal determines the EPD bedside card corresponding to the long data task. For example, the server terminal determines that EPD bedside card 1*m* administered by gateway 1 needs to receive long data (for example, long data A). Afterwards, the server terminal sends a notification message (for example, notification message 1) to the EPD bedside card 1*m* by the gateway 1 to notify the EPD bedside card 1*m* to prepare to receive the long data. Based on the notification message 1 from the server terminal, the EPD bedside card 1*m* is switched to a LoRa mode (an example of the above long data transmission module) before a designated moment (for example, the first moment). The server terminal may also designate a gateway for transmitting the long data for the EPD bedside card 1*m* in the notification message 1. The gateway configured to transmit the long data may be any gateway in the EPD bedside card system. For example, the gateway is the gateway 1, or the gateway is gateway 0 (the gateway 0 is not shown in FIG. 8, and the gateway 0 may be, for example, gateway 20 in FIG. 2). Other gateways in the EPD bedside card system do not need to make any changes and are still in a normal protocol stage. The server terminal designates the gateway 0 to transmit the long data for the EPD bedside card 1*m*, and the server terminal sends the notification message (for example, notification message 2) to the gateway 0. The gateway 0 is notified to switch to the LoRa mode before the designated moment, prepare to receive the long data, and send the long data to the EPD bedside card 1*m* from the designated moment. Since the LoRa mode and the FSK mode do not interfere with each other, sending, by the gateway 0, the long data to the EPD bedside card 1*m* and receiving, by the EPD bedside card 1*m*, the long data will not affect operation of other EPD bedside cards and gateways in the system, thus realizing the receiving of the long data of the system on the basis of remaining a fast response.

The notification message 1 may include indication information of the designated moment, indication information of the LoRa mode, a transmission parameter of the LoRa mode, and indication information of the gateway 0. Specifically, sending the notification message 1 to the EPD bedside card 1*m* by the gateway 1 may include: sending, by the server terminal, the notification message 1 to the gateway 1, and forwarding, by the gateway 1, the notification message 1 to the EPD bedside card 1*m*. Based on the notification message 1, the EPD bedside card 1*m* switches a transmission mode of the EPD bedside card 1*m* from the FSK mode to the LoRa mode at the designated moment based on the transmission parameter of the LoRa mode. In response to switching to LoRa mode, the EPD bedside card 1*m* may send response message 1 (for example, a response frame) to the server terminal by the gateway 1 to notify the server terminal that the EPD bedside card 1*m* has been successfully switched to the LoRa mode and prepared to receive the long data. Sending the response message 1 to the server terminal by the gateway 1 may include: sending, by the EPD bedside card 1*m*, the response message 1 to the gateway 1, and forwarding, by the gateway 1, the response message 1 to the server terminal.

The notification message 2 may include the indication information of the designated moment, the indication information of the LoRa mode, the transmission parameter of the LoRa mode, and the indication information of the EPD bedside card 1*m*. In response to receiving the notification message 2 issued by the server terminal, based on the notification message 2, the gateway 0 enables the LoRa mode at the designated moment based on the transmission parameter of the LoRa mode, and sends a response message 2 (for example, a response frame) to the server terminal to notify the server terminal that the gateway 0 has successfully switched to the LoRa mode and prepared to receive the long data.

In response to enabling the LoRa mode, the gateway 0 may receive the long data A issued by the server terminal. In addition, the gateway 0 may issue the long data A to the EPD bedside card 1*m* from the designated moment. The EPD bedside card 1*m* receives the long data A issued by the gateway 0 from the designated moment. In response to receiving the long data A, the EPD bedside card 1*m* may send a receiving result of the long data A to the gateway 0. The gateway 0 determines a transmission result of the long data A based on the receiving result of the long data A from the EPD bedside card 1*m*, sends the transmission result of the long data A to the background server, and waits for the next instruction of the background server. In the process that the gateway 0 sends the long data A, the gateway 0 remains a sending state. In the process that the EPD bedside card 1*m* receives the long data A, the EPD bedside card 1*m* remains a receiving state. If the long data A is received successfully or overtime, the EPD bedside card 1*m* is automatically switched to the FSK mode and re-accesses the network.

In response to receiving the transmission result of the long data A, the server terminal distributes the short data tasks based on the transmission result of the long data A and the information input by the user in the web interface to transmit the short data.

A communication distance of the LoRa mode is much greater than that of the FSK mode, in the LoRa mode, when the terminal (for example, the EPD bedside card) moves (for example, within a communication range), the terminal can still receive the long data normally. Therefore, in the LoRa mode, the terminal does not need to remain stationary in response to receiving the long data. It can be seen that the method for transmitting data according to the embodiment of the present disclosure can improve a transmission success rate of the long data, has less restriction on use of the terminal (for example, the terminal does not need to remain stationary), and improves user experience.

In the embodiment of the present disclosure, the server sends the target data (long data) to the target terminal by the first gateway. The first gateway may be any gateway with a long data transmission mode in the IoT system. The target terminal may be any IoT terminal in the IoT system. Before the first gateway enables the long data transmission mode, the first gateway needs to satisfy the condition: the first gateway has not established a network connection with a terminal other than the target terminal (the first gateway may establish the network connection with the target terminal, or may not establish the network connection with the target terminal, which is limited herein). If the server requires the first gateway to enable the long data transmission mode to transmit the long data (for example, target data) to the target terminal, the first gateway needs to firstly disconnect the network connection between the first gateway and the terminal other than the target terminal. In view of this, a specific gateway may be set in the IoT system to undertake the work of transmitting the long data, and the first gateway is the specific gateway. In some embodiments, the gateway with the least number of administered terminals in the IoT system is determined as the first gateway to transmit the long data to the target terminal. In this way, an impact of the process of transmitting the long data on the entire IoT system can be reduced, and stability in operation of the IoT system can be ensured. In response to completing the transmission of the long data, the first gateway can be switched to a short data transmission mode to transmit short data, which can reduce a hardware cost of the IoT system.

Figure 10:
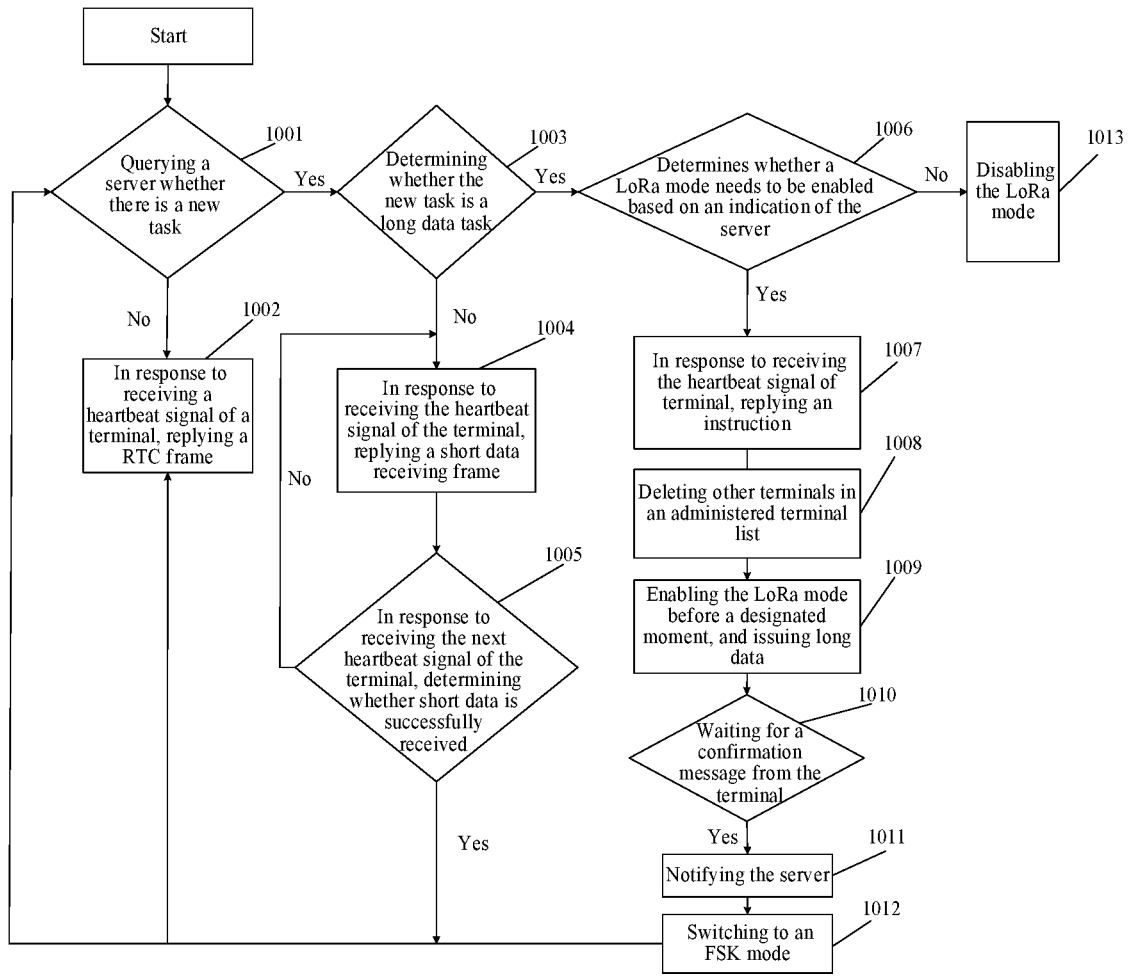
FIG. 10 is a flowchart of a method for transmitting data performed by a gateway according to an embodiment of the present disclosure.

By taking the gateway 21 shown in FIG. 1 or FIG. 2 as an example of the first gateway and the IoT terminal 21*l* in FIG. 1 or FIG. 2 as an example of the target terminal, the method for transmitting data performed by the first gateway is introduced in conjunction with FIG. 10. As shown in FIG. 10, the method may include the following processes:

In 1001, the gateway 21 queries a server whether there is a new task. If there is no new task, 1002 is performed. If there is a new task, 1003 is performed.

In 1002, in response to receiving a heartbeat signal of the IoT terminal 21*l*, the gateway 21 replies a real time clock (RTC) frame to the IoT terminal 21*l*.

In 1003, the gateway 21 determines whether the new task is a long data task. If the new task is not a long data task, 1004 to 1005 are performed. If the new task is a long data task, 1006 is performed.

In 1004, in response to receiving the heartbeat signal of the IoT terminal 21*l*, the gateway 21 replies a short data receiving frame to the IoT terminal 21*l* to send short data to the IoT terminal 21*l*.

In 1005, in response to receiving the next heartbeat signal of the IoT terminal 21*l*, the gateway 21 determines whether the short data of the IoT terminal 21*l* is successfully received. The process returns to 1001 if the short data is successfully received; and otherwise, the process return to 1004.

In 1006, the gateway 21 determines whether a LoRa mode needs to be enabled (the example of a long data transmission mode) based on an indication of the server. If the LoRa mode needs to be enabled, 1007 to 1012 are performed; and otherwise, 1013 is performed.

In 1007, in response to receiving the heartbeat signal of the IoT terminal 21*l*, the gateway 21 replies an instruction to the IoT terminal 21*l*.

In 1008, the gateway 21 deletes the terminals other than the IoT terminal 21*l* from a terminal list administered by the gateway 21 to disconnect the network connection between the gateway 21 and the terminal other than the IoT terminal 21*l*.

In 1009, the gateway 21 enables the LoRa mode before a designated moment, and issues long data to the IoT terminal 21*l* from the designated moment.

In 1010, the gateway 21 waits for a confirmation message from the IoT terminal 211.

In 1011, the gateway 21 notifies the server in response to receiving the confirmation message (or overtime message) of the IoT terminal 21*l*.

In 1012, the gateway 21 is switched to the FSK mode (the example of a short data transmission mode), and the process returns to 1001.

In 1013, the gateway 21 does not enable the LoRa mode.

Described above illustrates the method embodiments of the present disclosure, and the device embodiments of the present disclosure are described hereinafter.

An embodiment of the present disclosure provides a device for transmitting data, which is applicable to a server, a first gateway, or a target terminal. For example, the device for transmitting data is a server, a first gateway or a target terminal. The device for transmitting data may include: a memory and a processor. The memory is configured to store a computer program. The processor, when running the computer program, is caused to perform all or part of the processes of the method embodiments for transmitting data.

For example, the device for transmitting data is applicable to the server, and the processor, when running the computer program stored in the memory, is caused to perform relevant processes performed by the server in the above method for transmitting data.

For another example, the device for transmitting data is applicable to the first gateway, and the processor, when running the computer program stored in the memory, is caused to perform relevant processes performed by the first gateway in the method for transmitting data.

For yet another example, the device for transmitting data is applicable to the target terminal, and the processor, when running the computer program stored in the memory, is caused to perform relevant processes performed by the target terminal in the method for transmitting data.

Figure 11:
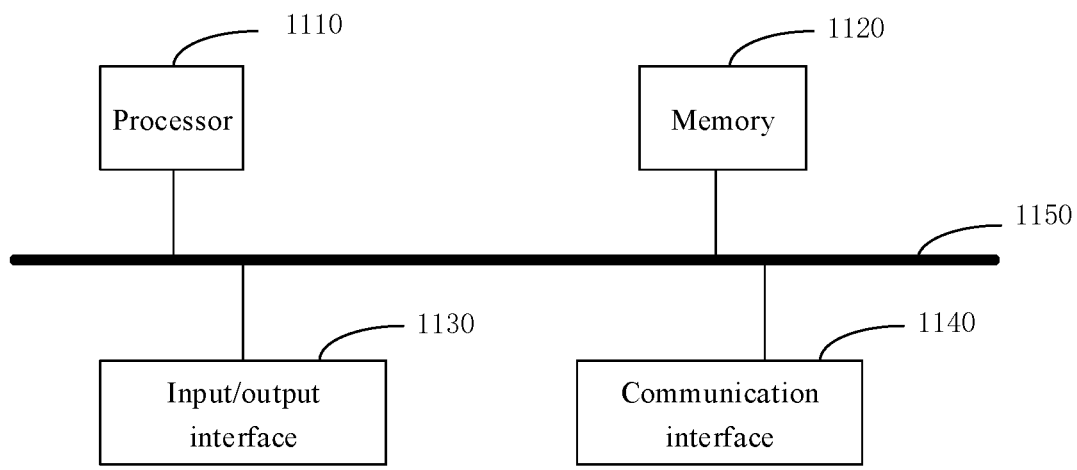
FIG. 11 is a schematic diagram of a device for transmitting data according to an embodiment of the present disclosure.

FIG. 11 is a schematic diagram of a device for transmitting data according to the embodiment of the present disclosure. As shown in FIG. 11, the device for transmitting data includes: a processor 1110, a memory 1120, an input/output interface 1130, a communication interface 1140, and a bus 1150. The processor 1110, the memory 1120, the input/output interface 1130, and the communication interface 1140 are communicatively connected by the bus 1150. This connection mode is only an example, and other fashions may also be adopted for connection, which are not repeated herein.

The processor 1110 may be implemented in a central processing unit (CPU), a microprocessor, an application specific integrated circuit (ASIC), or one or more integrated circuits. The processor 1110, when running the computer program, is caused to perform all or part of the processes in the method embodiments.

The memory 1120 may be implemented in the form of a read-only memory (ROM), a random-access memory (RAM), a static storage device, a dynamic storage device, and the like. The memory 1120 may store the computer program, and the computer program may include an operating system and other application programs. When the technical solutions according to the embodiments of the present disclosure are implemented by software or firmware, the computer program is stored in the memory 1120 and is called and run by the processor 1110.

The input/output interface 1130 is configured to connect an input/output module (not shown in the figure) to realize information input and output of the device for transmitting data. The input/output module may be configured as a component in the device for transmitting data to provide corresponding functions, or externally connected to the device for transmitting data to provide corresponding functions. The input module may include a keyboard, a mouse, a touch screen, a microphone, various sensors and the like. The output module may include a display, a speaker, a vibrator, an indicator light, and the like.

The communication interface 1140 is configured to connect a communication module (not shown in the figure) to realize communication interaction between the device for transmitting data and other devices. The communication module can realize communication in a wired fashion (such as a USB and a network cable), or in a wireless fashion (such as a mobile network, Wi-Fi, and Bluetooth).

The bus 1150 includes a path for transmitting information between various components of the device for transmitting data (for example, the processor 1110, the memory 1120, the input/output interface 1130, and the communication interface 1140).

Although the foregoing device for transmitting data only shows the processor 1110, the memory 1120, the input/output interface 1130, the communication interface 1140, and the bus 1150, in a specific process, the device for transmitting data may also include other components necessary for normal operation. The foregoing device for transmitting data may also only include the components necessary to implement the solutions of the embodiments of the present disclosure instead of all the components shown in the figure. For example, when the device for transmitting data is the first gateway, the device for transmitting data may not include the input/output interface 1130, which is not limited in the embodiment of the present disclosure.

The embodiment of the present disclosure also provides a communication system, and the communication system may be an IoT system. For example, the communication system is the communication system shown in FIG. 1 or FIG. 2.

The communication system includes a server, a first gateway, and a target terminal. The server is configured to perform the method for transmitting data performed by the server as described above. The first gateway is configured to perform the method for transmitting data performed by the first gateway as described above. The target terminal is configured to perform the method for transmitting data performed by the target terminal as described above. In some embodiments, the communication system further includes the second gateway described in the foregoing embodiment.

An embodiment of the present disclosure provides a non-transitory computer-readable storage medium in which a computer program is stored. The computer program, when run by a processor of an electronic device, causes the electronic device to perform all or part of the processes in the method embodiments. The computer-readable storage medium includes permanent storage mediums, non-permanent storage mediums, removable storage mediums, non-removable storage mediums, and other storage mediums that can implement information storage by any method or technology. The information stored in the computer-readable storage medium may be computer-readable instructions, data structures, program modules, or other data. The computer-readable storage medium includes but not limited to: a parameter random-access memory (PRAM), a static random-access memory (SRAM), a dynamic random-access memory (DRAM), other types of RAMs, ROMs, an electrically erasable programmable read-only memory (EEPROM), a flash memory or other memory technologies, a compact disc read-only memory (CD-ROM), a digital video disc (DVD) or other optical storage, a magnetic cassette tape, a magnetic tape magnetic disk storage or other magnetic storage devices or any other non-transmission mediums, and can be configured to store the information that can be accessed by computing devices.

The methods in the embodiments of the present disclosure may be performed by a single device, for example, performed by a computer or a server, and may also be applied in a distributed scenario, and performed by cooperation of a plurality of devices. In the distributed scenario, one of these devices may perform one or more processes in the methods of the embodiments of the present disclosure, and the multiple devices will interact with each other to complete the methods of the embodiments of the present disclosure.

Described above are some embodiments of the present disclosure. Other embodiments are within the scope of the appended claims. In some cases, the actions or processes described in claims may be performed in a different order than in the embodiments and still achieve desired results. In addition, the processes depicted in the drawings do not necessarily require the specific order or sequential order shown to achieve the desired results.

Those of ordinary skill in the art to which the present disclosure belongs should understand: the discussion of any of the above embodiments is only exemplary, and is not intended to imply that the scope of the present disclosure (including the claims) is limited to these examples. Under the thought of the present disclosure, the technical features in the above embodiments or different embodiments may also be combined, the processes may be performed in any order, and there are many other changes in different aspects of the embodiments of the present disclosure as described above, which are not provided in details for the sake of brevity.

In addition, in order to simplify the description and discussion, and to facilitate the understanding of the embodiments of the present disclosure, the devices are shown in the form of block diagrams in the provided drawings, and this also takes into account the following fact that the details regarding the embodiments of the devices in these block diagrams depend on the platform on which the embodiments of the present disclosure will be implemented (that is, these details should be fully within the understanding of those skilled in the art). In the case where the specific details are described to describe the exemplary embodiments of the present disclosure, it is obvious for those skilled in the art that the embodiments of the present disclosure can be implemented without these specific details or when these specific details are changed. Therefore, these descriptions should be considered illustrative rather than restrictive.

Although the present disclosure has been described in conjunction with the exemplary embodiments of the present disclosure, based on the foregoing description, many substitutions, modifications and variations of these embodiments will be apparent to those of ordinary skill in the art. The embodiments of the present disclosure cover all such substitutions, modifications and variations that fall within a broad scope of appended claims. Therefore, any omissions, modifications, equivalent substitutions, improvements, and the like, made within spirits and principles of the embodiments of the present disclosure should be included in the protection scope of the present disclosure.

What is claimed is:

1. A method for transmitting data, applicable to a server, the method comprising:
   sending a first message to a target terminal in response to determining that target data corresponding to the target terminal is long data, wherein the first message is intended to instruct the target terminal to enable a long data transmission mode before a first moment, and the long data is data untransmittable between a terminal and a gateway within one time slot and has a ratio of greater than one between its data length to that of a length of effective data that can be sent by the gateway within one time slot,
   wherein the gateway comprises a first gateway and a second gateway, and only the first gateway has a long data transmission mode and a short data transmission mode and is enabled to be switched between the long data transmission mode and the short data transmission mode, the short data being data transmittable between the terminal and the gateway within one time slot; and
   sending a second message to the first gateway, wherein the second message is intended to instruct the first gateway to enable the long data transmission mode before the first moment to receive the target data from the server, and the target data is sent to the target terminal from the first moment; wherein prior to sending the first message by the server, the target terminal satisfies: the gateway accessed by the target terminal is the second gateway, the first message further comprises indication information of the first gateway to indicate to the target terminal to switch from the second gateway to the first gateway.

2. The method according to claim 1, wherein the first message and the second message each comprise a transmission parameter of the long data transmission mode.

3. The method according to claim 1, further comprising:
   determining a maximum communication distance of the first gateway in a first communication system, wherein the first communication system at least comprises the first gateway and the target terminal; and
   determining the transmission parameter of the long data transmission mode based on the maximum communication distance and a maximum communication rate corresponding to the maximum communication distance.

4. The method according to claim 1, wherein prior to sending the first message to the target terminal, the method further comprises:
   determining that the target data is the long data in response to determining that the target data satisfies at least one condition;
   wherein the at least one condition comprises: the target data comprises image data, the target data comprises firmware update data, and a data volume of the target data satisfies a preset condition.

5. The method according to claim 1, further comprising:
   receiving a transmission result of the target data from the first gateway; and
   sending a third message to the first gateway based on the transmission result, wherein the third message is intended to instruct the first gateway to switch from the long data transmission mode to the short data transmission mode.

6. A method for transmitting data, applicable to a first gateway, the method comprising:
   enabling a long data transmission mode before a first moment based on a second message from a server;
   receiving target data from the server in response to enabling the long data transmission mode, wherein the target data is long data, and the long data is data untransmittable between a terminal and a gateway within one time slot and has a ratio of greater than one between its data length to that of a length of effective data that can be sent by the gateway within one time slot,
   wherein the gateway comprises the first gateway and a second gateway, and only the first gateway has a long data transmission mode and a short data transmission mode and is enabled to be switched between the long data transmission mode and the short data transmission mode, the short data being data transmittable between the terminal and the gateway within one time slot; and
   sending the target data to a target terminal from the first moment based on the second message; wherein prior to sending the second message by the server, the target terminal satisfies: the gateway accessed by the target terminal is the second gateway, and the second message comprises indication information of the target terminal to indicate the first gateway that the target terminal needs to access the first gateway.

7. The method according to claim 6, wherein the second message comprises a transmission parameter of the long data transmission mode.

8. The method according to claim 6, wherein
   prior to enabling the long data transmission mode, the method further comprises:
   sending a data packet to the target terminal, wherein the target terminal is configured to determine the transmission parameter of the long data transmission mode based on the data packet; and
   receiving the transmission parameter of the long data transmission mode from the target terminal; and
   enabling the long data transmission mode before the first moment based on the second message from the server comprises:
   enabling the long data transmission mode before the first moment based on the second message and the transmission parameter of the long data transmission mode.

9. A method for transmitting data, applicable to a target terminal, the method comprising:
   enabling a long data transmission mode before a first moment based on a received first message; and receiving target data from a first gateway from the first moment based on the first message in response to enabling the long data transmission mode, wherein the target data is long data, and the long data is data untransmittable between a terminal and a gateway within one time slot and has a ratio of greater than one between its data length to that of a length of effective data that can be sent by the gateway within one time slot, wherein the gateway comprises the first gateway and a second gateway, and the gateway has a long data transmission mode and a short data transmission mode and is enabled to be switched between the long data transmission mode and the short data transmission mode, the short data being data transmittable between the terminal and the gateway within one time slot;

wherein prior to receiving the first message, the target terminal satisfies: the gateway accessed by the target terminal is the second gateway, and the first message further comprises indication information of the first gateway to indicate to the target terminal to switch from the second gateway to the first gateway.

10. The method according to claim 9, wherein the first message comprises a transmission parameter of the long data transmission mode.

11. The method according to claim 9, wherein prior to enabling the long data transmission mode, the method further comprises:

receiving a data packet from the first gateway;

determining the transmission parameter of the long data transmission mode based on the data packet; and enabling the long data transmission mode before the first moment based on the received first message comprises: enabling the long data transmission mode before the first moment based on the first message and the transmission parameter of the long data transmission mode.

12. A device for transmitting data, applicable to a server, the device comprising:

a memory and a processor; wherein the memory is configured to store a computer program; and the processor, when running the computer program stored in the memory, is caused to perform the method for transmitting data as defined in claim 1.

13. A device for transmitting data, applicable to a first gateway and comprising:

a memory and a processor; wherein the memory is configured to store a computer program; and the processor, when running the computer program stored in the memory, is caused to perform the method for transmitting data as defined in claim 6.

14. A device for transmitting data, applicable to a target terminal and comprising:

a memory and a processor; wherein the memory is configured to store a computer program; and the processor, when running the computer program stored in the memory, is caused to perform the method for transmitting data as defined in claim 9.

15. A non-transitory computer-readable storage medium, storing a computer program therein, wherein the computer program, when run by a processor of an electronic device, causes the electronic device to perform the method for transmitting data as defined in claim 1.

16. A non-transitory computer-readable storage medium, storing a computer program therein, wherein the computer program, when run by a processor of an electronic device, causes the electronic device to perform the method for transmitting data as defined in claim 6.

17. A non-transitory computer-readable storage medium, storing a computer program therein, wherein the computer program, when run by a processor of an electronic device, causes the electronic device to perform the method for transmitting data as defined in claim 9.

* * * * *